(12) United States Patent
Hayashi

(10) Patent No.: US 7,162,206 B2
(45) Date of Patent: Jan. 9, 2007

(54) TEST APPARATUS, MOBILE TERMINAL APPARATUS, TEST METHOD

(75) Inventor: Kazuo Hayashi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 214 days.

(21) Appl. No.: 10/612,289

(22) Filed: Jul. 3, 2003

(65) Prior Publication Data

US 2005/0124296 A1 Jun. 9, 2005

(30) Foreign Application Priority Data

Jan. 21, 2003 (JP) .............................. 2003-012312

(51) Int. Cl.
- H04B 17/00 (2006.01)
- H04B 7/216 (2006.01)
- H04Q 7/20 (2006.01)
- H04M 3/22 (2006.01)

(52) U.S. Cl. ...................... 455/67.11; 455/423; 379/21; 370/335

(58) Field of Classification Search ................ 455/423, 455/424, 425, 426.2, 427, 428, 429, 430, 455/431, 52.2, 126.1, 318, 311, 67.11, 67.13, 455/67.12, 6, 115.2, 67.14, 115.1, 226.1, 455/227, 229, 67.4, 234, 422.1; 370/349, 370/352, 335, 342, 328, 469, 490, 535; 379/2, 379/12, 19, 21, 29, 22.05, 26.01, 26.02, 27.01, 379/27.03, 27.04, 27.07, 29.01, 29.02, 274, 379/277, 29.05, 297, 337
See application file for complete search history.

(56) References Cited

U.S. PATENT DOCUMENTS

| | | | | |
|---|---|---|---|---|
| 6,680,913 B1* | 1/2004 | Malmivirta et al. | ........ | 370/249 |
| 6,832,075 B1* | 12/2004 | Henry, Jr. | ................ | 455/226.1 |
| 2001/0055298 A1* | 12/2001 | Baker et al. | ................ | 370/349 |
| 2002/0054578 A1* | 5/2002 | Zhang et al. | ............... | 370/328 |
| 2004/0258091 A1* | 12/2004 | Meyer et al. | ............... | 370/469 |
| 2005/0025188 A1* | 2/2005 | Numakura et al. | ......... | 370/490 |
| 2005/0135318 A1* | 6/2005 | Walton et al. | .............. | 370/338 |
| 2006/0039312 A1* | 2/2006 | Walton et al. | .............. | 370/319 |

FOREIGN PATENT DOCUMENTS

| | | |
|---|---|---|
| JP | 2000 022780 | 1/2000 |
| JP | 2000 041027 | 2/2000 |
| JP | 2000 258563 | 9/2000 |
| WO | 0051380 | 8/2000 |
| WO | 0126259 | 4/2001 |

\* cited by examiner

*Primary Examiner*—Naghmeh Mehrpour
(74) *Attorney, Agent, or Firm*—Stevens, Davis, Miller & Mosher, LLP

(57) ABSTRACT

Test apparatus 100 judges a test item, and when carrying out a radio transmission characteristics test, communicates layer 3 signals with mobile terminal apparatus 150 to implement radio connection over CDMA radio interface and transmit a measurement signal. In transmitting the measurement signal, mobile terminal RLC control section 109 notifies RLC section 152 of suspension of transmission of a signaling signal, and based on the notification, RLC section 152 suspends transmission of a signaling signal and transmits only the measurement signal. It is thereby possible to carry out the radio transmission characteristics test with constant transmission power without providing the mobile terminal apparatus with a function only required for the radio transmission characteristics test.

7 Claims, 3 Drawing Sheets

| Step | Direction | | Message |
|---|---|---|---|
| | MOBILE TERMINAL | TEST APPARATUS | |
| 0 | | | |
| 1 | ←--- | | PAGING TYPE1(PCCH) |
| 2 | ---→ | | RRC CONNECTION REQUEST (CCCH) |
| 3 | ←--- | | RRC CONNECTION SETUP (CCCH) |
| 4 | ---→ | | RRC CONNECTION SETUP COMPLETE (DCCH) |
| 5 | ---→ | | PAGING RESPONSE |
| 6 | ←--- | | ACTIVATE RB TEST MODE |
| 7 | ---→ | | ACTIVATE RB TEST MODE COMPLETE |
| 8 | ←--- | | RADIO BEARER SETUP |
| 9 | ---→ | | RADIO BEARER SETUP COMPLETE |
| 10 | ←--- | | CLOSE UE TEST LOOP (DCCH) |
| 11 | ---→ | | CLOSE UE TEST LOOP COMPLETE |
| | | | UNDER TEST |
| 12 | ←--- | | OPEN UE TEST LOOP |
| 13 | ---→ | | OPEN UE TEST LOOP COMPLETE |
| 14 | ←--- | | RRC CONNECTION RELEASE |
| 15 | ---→ | | RRC CONNECTION RELEASE COMPLETE |

FIG.3

TEST APPARATUS, MOBILE TERMINAL APPARATUS, TEST METHOD

BACKGROUND OF THE INVENTION

1. Field of the Invention

The present invention relates to a test apparatus, mobile terminal apparatus and test method to conduct radio transmission characteristics test and radio function test on the mobile terminal apparatus in a CDMA mobile communication system.

2. Description of the Related Art

A mobile communication terminal in a CDMA mobile communication system has a function of transmitting and receiving signaling signals and function of transmitting and receiving user information, and the transmission power is determined depending on the present or absence of each of the two kinds of signals.

In a radio transmission characteristic test in layer 1 on a mobile terminal apparatus, a test apparatus transmits a signal to be measured (hereinafter referred to as a "measurement signal") as user information to the mobile terminal apparatus, and the mobile terminal apparatus transmits the measurement signal as the user information to the test apparatus using the loopback function.

In the radio transmission characteristic test, it is preferable that the transmission power is constant. However, since signaling signals are transmitted intermittently, some measures are required to keep transmission power constant.

In a conventional test method, a communication terminal apparatus transmits an additional signal (hereinafter referred to as "dummy transmission") for a period during which a signaling signal is not transmitted, and thereby keeps transmission power constant.

However, performing dummy transmission is an unnecessary function except the radio transmission characteristic test, and the conventional test method has a problem that a mobile terminal apparatus must be provided with the function only required for the radio transmission characteristic test.

SUMMARY OF THE INVENTION

It is an object of the present invention to provide a test apparatus, mobile terminal apparatus and test method that enable the radio transmission characteristic test to be carried out with constant transmission power without providing the mobile terminal apparatus with the function only required for the radio transmission characteristic test.

The object is achieved by the test apparatus which judges a type of test, and in the radio transmission characteristic test, carries out control for suspending the mobile terminal apparatus from transmitting a signaling signal.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 3 is a sequence diagram illustrating communication procedures for a radio transmission characteristic test on the mobile terminal apparatus carried out by the test apparatus according to the above embodiment.

DETAILED DESCRIPTION OF THE PREFERRED EMBODIMENT

The inventor of the present invention noted that a signaling signal is unnecessary in a radio transmission characteristic test, and has reached the present invention. In other words, it is a subject matter of the present invention that a test apparatus judges a type of test, and in the radio transmission characteristic test, carries out control for suspending a mobile terminal apparatus from transmitting a signaling signal.

An embodiment of the present invention will be described below with reference to accompanying drawings.

(Embodiment)

Figure 1:
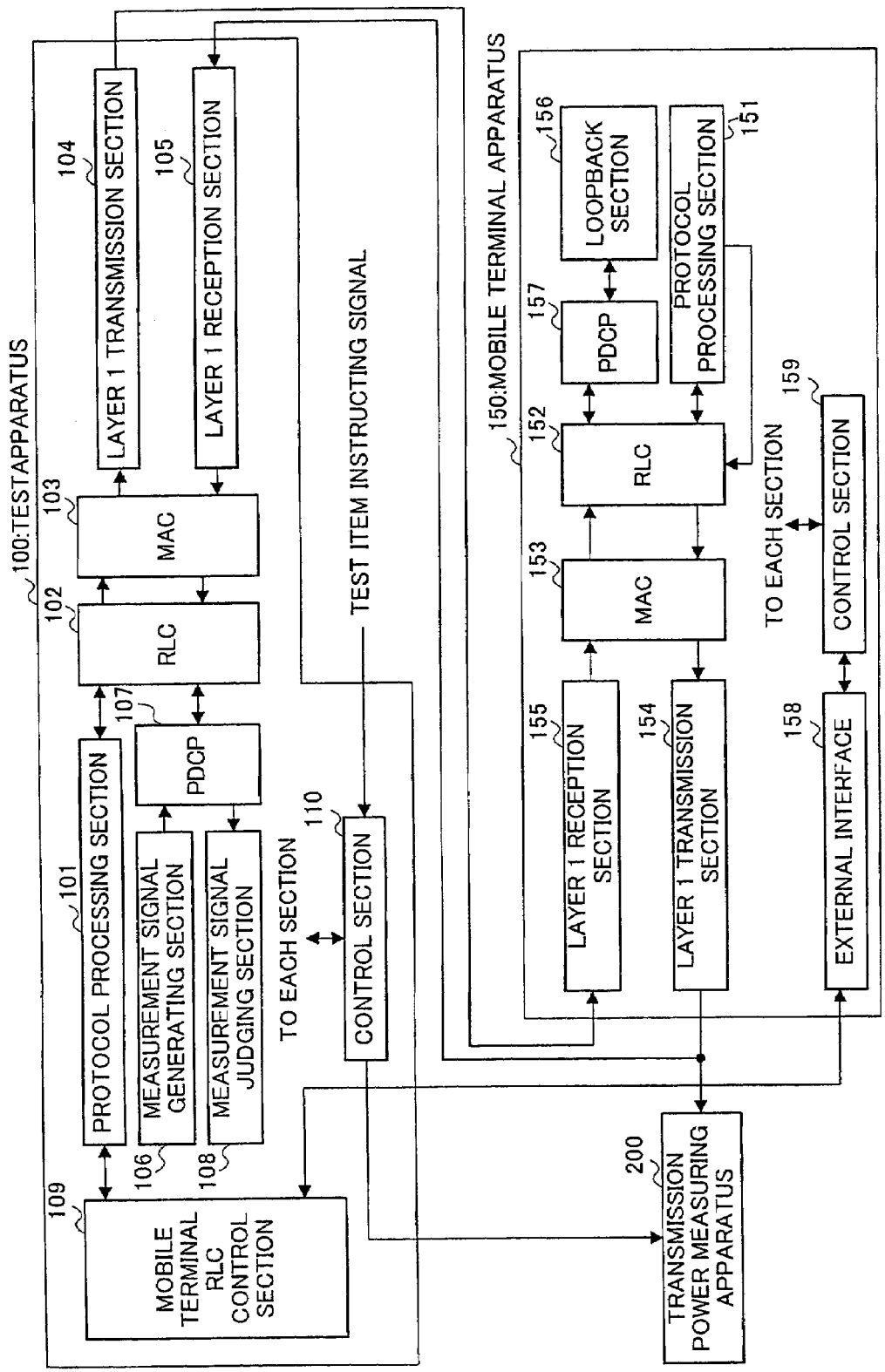
FIG. 1 is a block diagram illustrating a configuration of a test apparatus and mobile terminal apparatus according to one embodiment of the present invention.

FIG. 1 is a block diagram illustrating a configuration of a test apparatus and mobile terminal apparatus according to one embodiment of the present invention.

Test apparatus 100 in FIG. 1 is primarily comprised of protocol processing section 101, RLC (Radio Link Control) section 102, MAC (Media Access Control) section 103, layer 1 transmission section 104, layer 1 reception section 105, measurement signal generating section 106, PDCP (Packet Data Convergence Protocol) section 107, measurement signal judging section 108, mobile terminal RLC control section 109, and control section 110 that controls the above-mentioned sections.

Mobile terminal apparatus 150 in FIG. 1 is primarily comprised of protocol processing section 151, RLC section 152, MAC section 153, layer 1 transmission section 154, layer 1 reception section 155, loopback section 156, PDCP section 157, external interface 158, and control section 159 that controls the above-mentioned sections.

Transmission power measuring apparatus 200 measures the power of a signal transmitted from a mobile communication terminal apparatus to perform radio transmission characteristic evaluation.

In starting the test, a signal for instructing a test item is input to control section 110 in test apparatus 100 from outside.

When the test item is of radio transmission characteristic test, test apparatus 100 transmits a layer 3 signal to establish radio connection with mobile terminal apparatus 150 by CDMA radio interface, and further transmits a measurement signal.

Protocol processing section 101 in test apparatus 100 communicates layer 3 signals with protocol processing section 151 in mobile terminal apparatus 150.

Specifically, a layer 3 signal generated in protocol processing section 101 is transmitted over the CDMA radio interface via RLC section 102, MAC section 103 and layer 1 transmission section 104, and is received in protocol processing section 151 via layer 1 reception section 155, MAC section 153 and RLC section 152. Further, a layer 3 signal generated in protocol processing section 151 is transmitted over the CDMA radio interface via RLC section 152, MAC section 153 and layer 1 transmission section 154, and is received in protocol processing section 101 via layer 1 reception section 105, MAC section 103 and RLC section 102.

In transmitting the layer 3 signal, mobile terminal RLC control section 109 notifies RLC section 152 of suspension of periodical automatic transmission of STATUS_PDU (signaling signal) that is one of RLC functions.

The layer 3 signals are communicated between protocol processing sections 101 and 151, whereby the CDMA radio interface is set (adjustments on communication content, communication rate, etc. on layer 1).

Measurement target signal generating section 106 and measurement signal judging section 108 in test apparatus 100 communicate a measurement signal for the radio transmission characteristic test with loopback section 156 in mobile terminal apparatus 150. At this point, transmission power measuring apparatus 200 receives a notification indicating that the test condition is prepared from control section 110 in test apparatus 100, and starts measuring the power.

Specifically, a measurement signal generated in measurement signal generating section 106 is transmitted over the CDMA radio interface via PDCP section 107, RLC section 102, MAC section 103 and layer 1 transmission section 104, and is received in loopback section 156 via layer 1 reception section 155, MAC section 153, RLC section 152 and PDCP section 157. The measurement signal received in loopback section 156 is transmitted in loopback according to a predetermined loopback rule specified in advance by loopback function (hereinafter, the processing in loopback section 156 is referred to as "loopback processing"). The measurement signal transmitted from loopback section 156 is transmitted over the CDMA radio interface via PDCP section 157, RLC section 152, MAC section 153 and layer 1 transmission section 154, and is received in measurement signal judging section 108 via layer 1 reception section 105, MAC section 103, RLC section 102 and PDCP section 107. Measurement target signal judging section 108 performs radio characteristics evaluation based on the received measurement signal. The measurement signal transmitted from layer 1 transmission section 154 over the CDMA radio interface is received in transmission power measuring apparatus 200. Transmission power measuring apparatus 200 performs radio transmission characteristics evaluation based on the received measurement signal.

At this point, in the loopback processing, RLC section 152 suspends transmission of a signaling signal based on the notification from mobile terminal RLC control section 109, and transmits only the measurement signal. As a result, uplink transmission power is kept constant.

Among methods for notifying RLC section 152 of suspension of transmission of a signaling signal are, for example, (1) a method where mobile terminal RLC control section 109 transmits a control signal to protocol processing section 151 via protocol processing section 101, RLC section 102, MAC section 103, layer 1 transmission section 104, layer 1 reception section 155, MAC section 153 and RLC section 152, and protocol processing section 151 notifies RLC section 152 and (2) another method where mobile terminal RLC control section 109 transmits a control signal to control section 159 via external interface 158, and control section 159 notifies RLC section 152.

Figure 2:
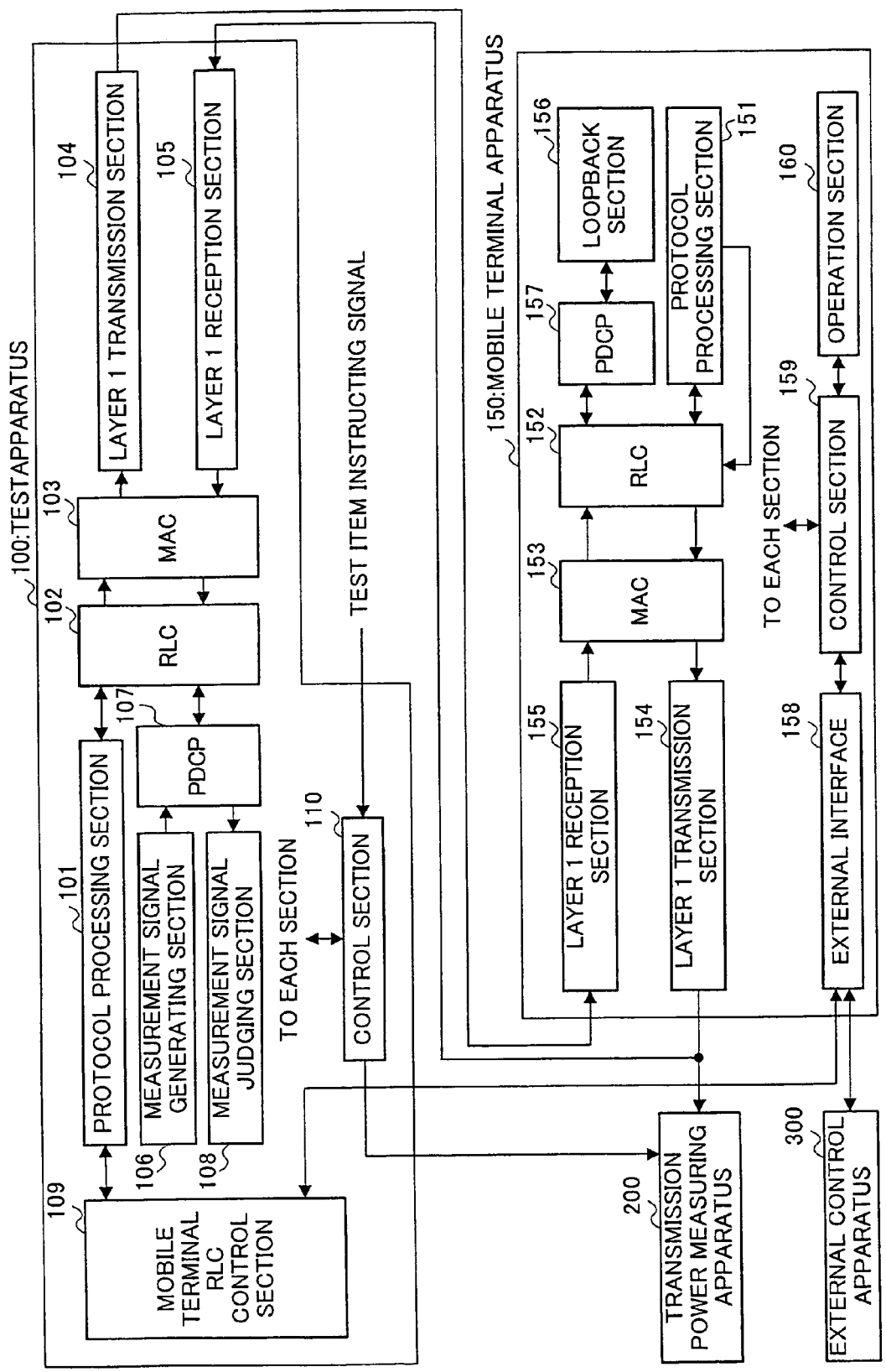
FIG. 2 is a block diagram illustrating another configuration of a test apparatus and mobile terminal apparatus according to the above embodiment.

In addition, it may be possible to suspend transmission of a signaling signal in RLC section 152 in advance before starting the test. In this case, as shown in FIG. 2, considered are (3), for example, a method where external control apparatus 300 is connected with mobile terminal apparatus 150, transmits a control signal to control section 159 via external interface 158, and control section 159 notifies RLC section 152, and another method (4) where mobile terminal apparatus 150 is provided with operation section 160 that conveys an instruction due to operation of a user to control section 159, operation section 160 transmits a control signal to control section 159, and control section 159 notifies RLC section 152.

Thus, in this embodiment, a test item is judged, and in the radio transmission characteristics test, transmission of a signaling signal is suspended in RLC section 152 in mobile terminal apparatus 150, thus keeping the uplink transmission power constant.

In addition, during the test, control sections 110 and 159 control sections in respective apparatuses.

Referring to the sequence diagram in FIG. 3, communication procedures will be described for radio transmission characteristics test on the mobile terminal apparatus carried out by the test apparatus according to this embodiment.

In step 0, the test apparatus receives a notification of a test item and determines that the radio transmission characteristics test is selected. In step 1, the test apparatus transmits a signal of reception indicative of start of the test to the mobile terminal apparatus. In step 2, upon receiving the signal, the mobile terminal apparatus transmits a signal for requesting to start radio connection over CDMA radio interface to the test apparatus. In step 3, the test apparatus transmits a signal for requesting to set the CDMA radio interface to the mobile terminal apparatus. In step 4, based on the signal, the mobile terminal apparatus carries out the setting, and transmits a signal for reporting completion of setting of the CDMA radio interface. Then, in step 5, the mobile terminal apparatus transmits a response signal to the reception in step 1.

It is a feature of the present invention that in step 3 suspension is set of periodical automatic transmission of STATUS_PDU (signaling signal) from the mobile terminal apparatus.

Next, in step 6, the test apparatus transmits a signal for requesting to eliminate a layer 3 signal that is not required as a mode of the test to the mobile terminal apparatus. In step 7, based on the signal, the mobile terminal apparatus eliminates the layer 3 signal and reports completion of the elimination to the test apparatus.

In step 8, the test apparatus transmits to the mobile terminal apparatus a signal for requesting for setting of conditions of layers 1 and 2 to transmit a measurement signal. In step 9, based on the signal, the mobile terminal apparatus carries out the setting of condition of layers 1 and 2, and transmits a signal for reporting completion of the setting to the test apparatus.

In step 10, the test apparatus transmits a signal for requesting for setting of condition to perform the loopback processing to loopback section 156 in the mobile terminal apparatus. In step 11, based on the signal, the mobile terminal apparatus carries out the setting of condition of the loopback processing, and transmits a signal for reporting completion of the setting to the test apparatus.

Subsequently, the test apparatus carries out the radio transmission characteristics test on the mobile terminal apparatus. At this point, since transmission of a signaling signal is suspended in the loopback processing, the uplink transmission power is kept constant.

After finishing the test, in step 12, the test apparatus transmits a signal for releasing the loopback processing to loopback section 156 in the mobile terminal apparatus. In step 13, based on the signal, the mobile terminal apparatus releases the loopback processing, and reports a signal for completion of the release to the test apparatus.

Finally, in step 14, the test apparatus transmits a signal for releasing the CDMA radio interface to the mobile terminal apparatus. In step 15, based on the signal, the mobile terminal apparatus releases the CDMA radio interface, and reports a signal for completion of the release to the test apparatus.

According to the above-mentioned communication procedures, the radio transmission characteristics test on the mobile terminal apparatus is completed that is carried out by the test apparatus according to the present invention.

As is apparent from the foregoing, according to the present invention, when a test item is of the radio transmission characteristics test, since it is possible to suspend transmission of a signaling signal in a mobile terminal apparatus, it is possible to carry out the radio transmission characteristics test with constant transmission power without providing the mobile terminal apparatus with a function only required for the radio transmission characteristics test.

The present invention is not limited to the above described embodiment, and various variations and modifications may be possible without departing from the scope of the present invention.

This application is based on the Japanese Patent Application No. 2003-012312 filed on Jan. 21, 2003, entire content of which is expressly incorporated by reference herein.

What is claimed is:

1. A radio terminal apparatus in a CDMA mobile communication system that controls the order of data transmission and data reception on a radio channel, transmits a signaling signal periodically, and, while communication is in progress, transmits signals applying different transmission powers according to the presence or absence of the signaling signal and user information, said radio terminal apparatus comprising:
   a radio receiver that receives a signal including one or both of user information and a signaling signal;
   a radio transmitter that transmits a signal including one or both of user information and a signaling signal;
   an RLC section that is connected to the radio receiver and the radio transmitter and that outputs a signaling signal, generated by the radio terminal apparatus, to the radio transmitter for transmission periodically;
   a protocol processor that sets a radio interface based on the received signal, provided by the radio receiver via the RLC section, and reports a suspension of transmission of the signaling signal to the RLC section, wherein:
   while communication is in progress, the radio transmitter transmits a transmission signal in which the signaling signal is inserted in the user information; and
   while a radio characteristics test is in progress, the RLC section suspends transmitting the signaling signal in response to the report from the protocol processor and the radio transmitter transmits the transmission signal comprising the user information alone at a fixed transmission power.

2. The radio terminal apparatus according to claim 1, further comprising a loopback section that receives a measurement signal comprising the user information transmitted from a test apparatus and transmits said measurement signal in loopback.

3. A test apparatus that performs a radio characteristics test of a radio terminal apparatus in a CDMA mobile communication system, said radio terminal apparatus comprising an RLC section that controls the order of data transmission and data reception on a radio channel, transmits a signaling signal periodically, and, while communication is in progress, transmits signals applying different transmission powers according to the presence or absence of the signaling signal and user information, said test apparatus comprising:
   a controller that sets a radio interface for the radio terminal apparatus before the radio characteristics test starts;
   a measurement signal generator that generates a measurement signal for use in the radio characteristics test and for transmission to the radio terminal apparatus; and
   a measurement signal determiner that receives the measurement signal transmitted in loopback from the radio terminal and performs a radio characteristics evaluation based on the received measurement signal, wherein
   while the radio characteristics test is in progress, the controller instructs the radio terminal apparatus to suspend transmitting a signaling signal and transmit a transmission signal comprising user information alone at a fixed transmission power.

4. The test apparatus according to claim 3, wherein said radio terminal apparatus is connected by wireless to the radio terminal apparatus via a radio interface and the controller sends the instruction to suspend transmission of the signaling signal via radio.

5. The test apparatus according to claim 3, wherein the test apparatus is connected by wire to the radio terminal apparatus and the controller sends the instruction to suspend transmission of the signaling signal via wire.

6. A radio transmission characteristics test method for use in a radio terminal apparatus that comprises an RLC section that controls the order of data transmission and data reception on a radio channel and that transmits a STATUS_PDU periodically, and, while communication is in progress, transmits signals applying different transmission powers according to the presence or absence of the signaling signal and user information, said method comprising:
   transmitting a request for wireless connection from a test apparatus;
   receiving an RRC CONNECTION SETUP request from the test apparatus;
   reporting completion of an RRC CONNECTION SETUP to the test apparatus; and
   subsequently performing a radio transmission characteristics test, wherein:
   receiving the RRC CONNECTION SETUP request comprises receiving a request for a suspension of transmission of the STATUS_PDU; and
   performing the radio transmission characteristics test comprises transmitting user information alone at a fixed transmission power without transmitting the STATUS_PDU.

7. The radio transmission characteristics test method according to claim 6, wherein performing the radio transmission characteristics test comprises receiving and transmitting in loopback a measurement signal comprising user information from the test apparatus.

* * * * *